United States Patent Office 2,754,327
Patented July 10, 1956

2,754,327

N,N-DIALKYLSALICYLAMIDES

Melville Sahyun, John A. Faust, and Leonard H. Jules, Santa Barbara, Calif., assignors, by mesne assignments, to Cutter Laboratories, Inc., Berkeley, Calif., a corporation of California No Drawing.  Application February 12, 1953,
Serial No. 336,644

5 Claims.  (Cl. 260—559)

This invention relates to certain substituted salicylamides and is more particularly concerned with N,N-disubstituted-2-substituted salicylamides.

Specifically, the compounds of the present invention have the following formula:

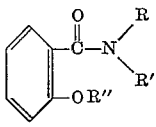

wherein R and R' are alkyl radicals and wherein R" is selected from the group consisting of lower alkylol and lower alkylene.

The novel compounds of the present invention may be readily prepared by reacting an N,N-dialkyl substituted salicylamide with a halognated lower alkanol, or lower alkenyl compound such as, for example, ethylene chlorohydrin, propylene bromhydrin, 4-chlorobutanol, 4-bromobutanol, beta-chloropropanol, gamma-chloropropanol, alpha-bromopropanol, iodohexanol, gamma-chloroheptanol, 3-chloropropene-1, bromobutene, 3-iodopentene-1, 5-bromopentene-1, 5-iodopentene-2, 1-iodopentene-2, 3-chlorohexene-1, 5-chloroheptene-1, 3-bromooctene-1, et cetera.  The reaction may be conducted by contacting the reactants in the presence of a halogen acceptor such as, for example, potassium carbonate, sodium carbonate, sodium hydroxide, et cetera.  A solvent is usually employed, but is not required.  Representative solvents which are satisfactory include, for example, water, methanol, ethanol, propanol, acetone, propylene glycol, ethylene glycol, et cetera.  The reaction is usually conducted at reflux temperature, however, other temperatures may be employed, if desired.  Reaction rate will be dependent upon the reaction temperature employed, the higher the temperature, the shorter the time necessary for completion of the reaction.  Separation of the reaction product may be easily accomplished by adding an alkaline agent to the reaction mixture with a sufficient quantity of water, distilling off the solvent and water at a reduced pressure, extracting the resulting mixture with ether, drying the ether and removing the ether by distillation.  Temperatures in excess of about 100 degrees centigrade are usually not employed in the reaction, since rearrangement of the reaction product may result.

The compounds of the present invention have utility as analgesic agents, being central nervous system depressants, and are especially useful because of their low toxicity, as well as being useful chemical intermediates.

The following examples are given to illustrate a preferred embodiment of the present invention and are one method by which the compounds of the present invention may be prepared, but it is to be understood that the said examples are not to be construed as limiting the invention thereto.

*Example 1.—N,N-diethyl-2-(2-hydroxyethoxy)benzamide*

A solution of 25.5 grams (0.13 mole) of N,N-diethylsalicylamide, six grams (0.15 mole) of sodium hydroxide, and 10.5 grams (0.13 mole) of ethylenechlorohydrin in 200 milliliters of water in a pressure bottle, was heated at 90–100 degrees centigrade in a water bath for eight hours, cooled, and extracted with three 50-milliliter portions of chloroform.  The extracts were combined, dried with magnesium sulfate, the solvent removed, and the residue distilled.  There was thus obtained 18.2 grams (59 percent of the theoretical yield) of N,N-diethyl-2-(2-hydroxyethoxy)benzamide, boiling at 160–162 degrees centigrade at approximately 1–2 millimeters of mercury absolute.  This material is a colorless liquid soluble in water at twenty degrees centigrade to the extent of approximately twenty percent, and possesses a pH in a one percent aqueous solution of about 5.90.

*Analysis.*—Calculated: N 5.90.  Found: N 6.07.

*Example 2.—N,N-dimethyl-2-(2-hydroxyethoxy) benzamide*

In a manner similar to that of Example 1, a solution of 21.5 grams (0.13 mole) of N,N-dimethylsalicylamide, 10.5 grams (0.13 mole) of ethylene chlorohydrin, six grams (0.15 mole) of sodium hydroxide and 200 milliliters of water was heated in a water bath at 90–100 degrees centigrade for eight hours, extracted and distilled.  There was thus obtained 18 grams (66 percent of the theoretical yield) of a yellowish product, N,N-dimethyl-2-(2-hydroxyethoxy)benzamide, boiling at 160–162 degrees centigrade at approximately one millimeter of mercury absolute.  This material is soluble in water to the extent of approximately twenty percent at twenty degrees centigrade, and has a pH of 6.15 in a one percent aqueous solution.

*Analysis.*—Calculated: N 6.69.  Found: N 6.62.

In a manner similar to that of the above examples, other N,N-dialkylsalicylamides may be reacted with other halogenated alkanols to prepare compounds of the present invention.  For example, N,N-dipropylsalicylamide, N,N-dihexylsalicylamide, N,N-dioctylsalicylamide, N,N-dipentylsalicylamide, et cetera, may be condensed with 5-chloropentanol-1,6-iodohexanol-2, et cetera.

*Example 3.—N,N - dimethyl-2-(2-propenoxy)benzamide*

A mixture of 14.2 grams (0.086 mole) of N,N-dimethylsalicylamide, 10.9 grams (0.09 mole) of allyl bromide, 12.4 grams (0.09 mole) of potassium carbonate, and 300 milliliters of dry acetone were refluxed for eight hours, and then combined with 1200 milliliters of dilute sodium hydroxide, having a pH between about 10 and about 12.  The solvent was distilled off under reduced pressure until an oil separated.  Following the extraction of the oil with ether, and drying of the ether extract with anhydrous magnesium sulfate, the ether was removed by distillation under reduced pressure.  There was thus obtained 10.5 grams (59 percent of the theoretical yield) of N,N-dimethyl-2-(2-propenoxy)benzamide, having a boiling point of 126–128 degrees centigrade at approximately one millimeter of mercury absolute.  The ferric chloride test for phenol indicated the possible presence of at least a trace of N,N-dimethyl-3-(2-propenyl)salicylamide formed during the distillation.

*Analysis.*—Calculated: N 6.82.  Found: N 6.72.

*Example 4.—N,N-diethyl-2-(2-propenoxy)benzamide*

In a manner similar to that of Example 3, a mixture of 19.3 grams (0.1 mole) of N,N-diethylsalicylamide, 7.7 grams (0.1 mole) of allyl chloride, 1.6 grams (0.01 mole) of potassium iodide, 13.8 grams (0.1 mole) of potassium carbonate, and 130 milliliters of dry acetone were refluxed for eight hours, extracted and distilled.  There was thus obtained 20.3 grams (87 percent of the theoretical yield) of N,N-diethyl-2-(2-propenoxy)benzamide having a boiling point of 127–130 degrees centigrade at approximately one millimeter of mercury absolute. The ferric chloride test for the phenolic group indicated the possible presence of some N,N-diethyl-3-(2-propenyl)salicylamide formed during the distillation.

In a manner similar to that of the above examples, other N,N-dialkylsalicylamides such as N,N-dipropylsalicylamide, N,N-dioctylsalicylamide, N,N-dihexylsalicylamide, N,N-dipentylsalicylamide, N-methyl-N-ethylsalicylamide, et cetera, may be condensed with other halogenated alkylene materials to prepare the corresponding substituted salicylamide.

Various modifications may be made in the method of the present invention without departing from the spirit or scope thereof, and it is to be understood that we limit ourselves only as defined in the appended claims.

We claim:
1. A compound having the formula:

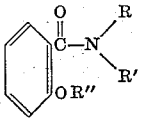

wherein R and R' are lower alkyl radicals and wherein R" is selected from the group consisting of lower hydroxy alkyl containing at least two carbon atoms and lower alkenyl containing at least three carbon atoms.
2. N,N-diethyl-2-(2-hydroxyethoxy)benzamide.
3. N,N-dimethyl-2-(2-hydroxyethoxy)benzamide.
4. N,N-dimethyl-2-(2-propenoxy)benzamide.
5. N,N-diethyl-2-(2-propenoxy)benzamide.

References Cited in the file of this patent
UNITED STATES PATENTS 2,694,088     Sahyun et al. _____ Nov. 9, 1954

OTHER REFERENCES

Van Allan: "JACS," vol. 69 (1947), pp. 2913–14.
Carron et al.: "Therapie," vol. 7, No. 1, 1952, pp. 27–36.
Frei et al.: "J. Exp. Med.," vol. 31 (1923), p. 352.
Berger: "J. Pharm. Exptl. Therapy," vol. 93 (1948), pp. 470–75.